United States Patent
Agrawal

(10) Patent No.: US 12,441,358 B2
(45) Date of Patent: Oct. 14, 2025

(54) MULTI-HEAD MACHINE LEARNING MODEL FOR PROCESSING MULTI-SENSOR DATA

(71) Applicant: GM Cruise Holdings LLC, San Francisco, CA (US)

(72) Inventor: Pranay Agrawal, San Jose, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 233 days.

(21) Appl. No.: 18/158,973

(22) Filed: Jan. 24, 2023

(65) Prior Publication Data
US 2024/0246559 A1   Jul. 25, 2024

(51) Int. Cl.
*B60W 60/00*   (2020.01)

(52) U.S. Cl.
CPC ..... *B60W 60/001* (2020.02); *B60W 2420/403* (2013.01); *B60W 2420/408* (2024.01); *B60W 2554/4048* (2020.02); *B60W 2554/4049* (2020.02)

(58) Field of Classification Search
CPC ....... B60W 60/001; B60W 2554/4048; B60W 2554/4049; B60W 2420/408; B60W 2420/403
See application file for complete search history.

(56) References Cited

U.S. PATENT DOCUMENTS

| | | | | |
|---|---|---|---|---|
| 11,532,168 | B2 * | 12/2022 | Smolyanskiy | G06V 10/82 |
| 2021/0406560 | A1 * | 12/2021 | Park | G06T 7/70 |

OTHER PUBLICATIONS

Brodermann et al "HRFuser: A Multi-resolution Sensor Fusion Architecture for 2D Object Detection"; 2022 (Year: 2022).*
Erabati et al, "MSF3DDETR: Multi-Sensor Fusion 3D Detection Transformer for Autonomous Driving" (Year: 2022).*
Canizo et al, "Multi-head CNN-RNN for multi-time series anomaly detection: An industrial case study" (Year: 2019).*
Chavez-Garcia et al, "Multiple Sensor Fusion and Classification for Moving Object Detection and Tracking"; (Year: 2016).*
Sidhu et al, "Scalable Primitives for Generalized Sensor Fusion in Autonomous Vehicles" (Year: 2021).*

* cited by examiner

*Primary Examiner* — Kenneth M Dunne
(74) *Attorney, Agent, or Firm* — CANTOR COLBURN LLP

(57) ABSTRACT

Systems and techniques are provided for processing sensor data using a machine learning model. An example method can include receiving, by a machine learning model configured to perform object detection, sensor data corresponding to one or more sensors on an autonomous vehicle; determining, based on the sensor data, a first object prediction by a first detection head of the machine learning model, wherein the first detection head is configured to generate the first object prediction based on a first input from a first sensor from the one or more sensors; and determining, based on the sensor data, a second object prediction by a second detection head of the machine learning model, wherein the second detection head is configured to generate the second object prediction based on a fusion of the first input from the first sensor and a second input from a second sensor from the one or more sensors.

20 Claims, 6 Drawing Sheets

MULTI-HEAD MACHINE LEARNING MODEL FOR PROCESSING MULTI-SENSOR DATA

BACKGROUND

1. Technical Field

The present disclosure generally relates to autonomous vehicles and, more specifically, to a machine learning model having multiple detection heads that are associated with a single backbone for processing sensor data.

2. Introduction

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at fixed locations on the autonomous vehicles.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
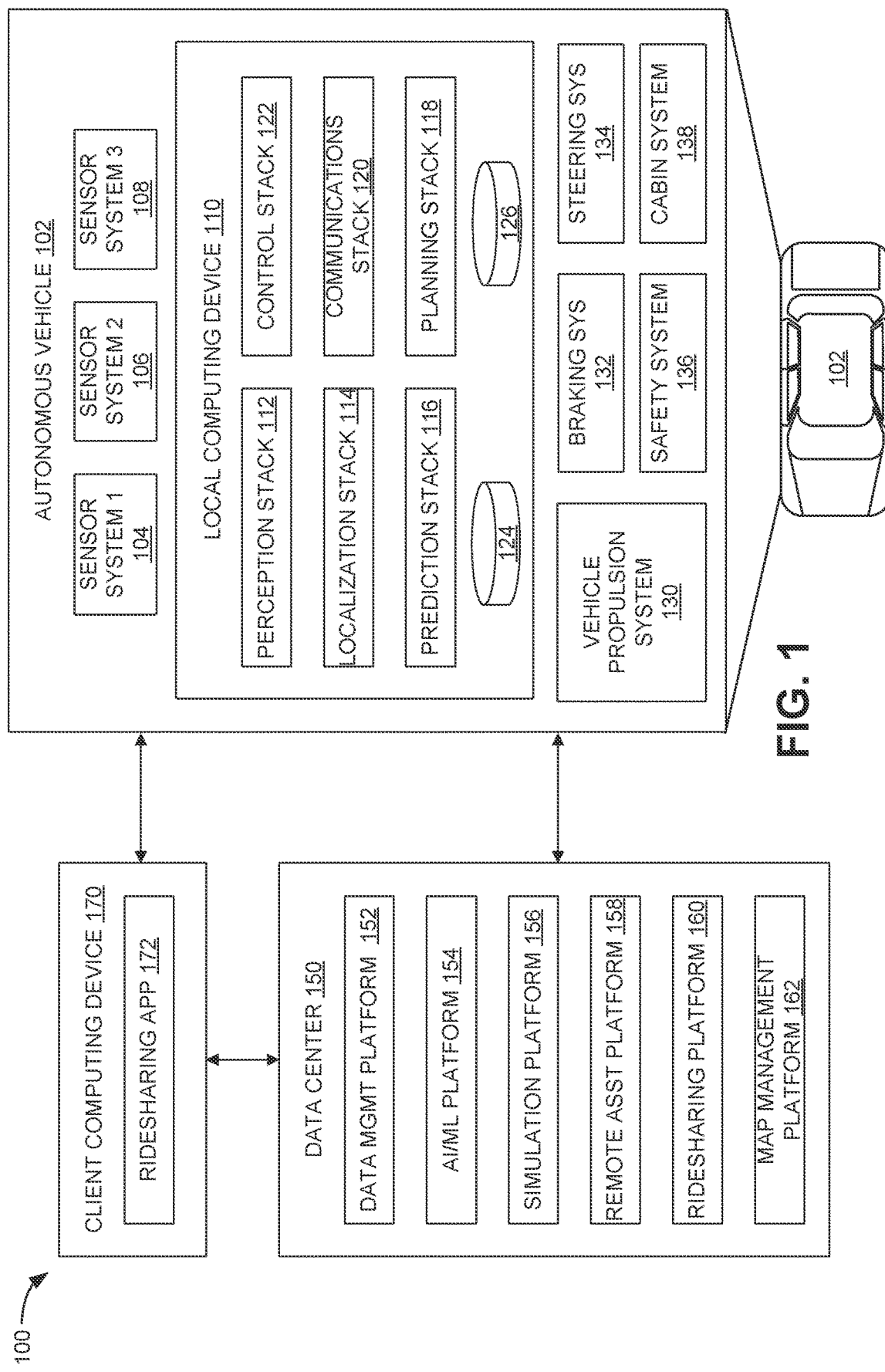
FIG. 1 is a diagram illustrating an example system environment that can be used to facilitate autonomous vehicle (AV) navigation and routing operations, in accordance with some examples of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

One aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Autonomous vehicles (AVs), also known as self-driving cars, driverless vehicles, and robotic vehicles, are vehicles that use sensors to sense the environment and move without human input. For example, AVs can include sensors such as a camera sensor, a LIDAR sensor, and/or a RADAR sensor, amongst others, which the AVs can use to collect data and measurements that are used for various AV operations. The sensors can provide the data and measurements to an internal computing system of the autonomous vehicle, which can use the data and measurements to control mechanical systems of the autonomous vehicle, such as a vehicle propulsion system, a braking system, and/or a steering system, etc.

In some cases, an AV may include a machine learning model that is configured (e.g., trained) to perform object detection based on data from various sensors (e.g., camera sensor data, LiDAR sensor data, RADAR sensor data, etc.). In some examples, the machine learning model that performs object detection is trained to use data from multiple sensor modalities. For example, the object detection machine learning model may be trained using LiDAR sensor data and camera sensor data that can be fused (e.g., combined) by a sensor fusion backbone prior to making a prediction. In some cases, if a sensor modality is unavailable (e.g., sensor is defective, broken, dirty, etc.), the object detection model may yield predictions that are deficient. For example, if a camera defective, the camera sensor data will be unavailable and/or otherwise useless to the model as it attempts to fuse the camera data with corresponding LiDAR data. Consequently, the resulting object classification and/or bounding box may be unreliable or associated with a relatively low confidence score.

Systems and techniques are provided herein for processing sensor data using a machine learning model having multiple detection heads corresponding to different sensor modalities. In some examples, a machine learning model may include a camera detection head, a LiDAR detection head, a RADAR detection head, a fused sensor detection head, and/or any combination thereof. In some cases, the multiple detection heads can operate in parallel and be associated with a single sensor fusion backbone. In some examples, the multiple detection heads can be trained adaptively given the input training data (e.g., the LiDAR detection head can be trained using only LiDAR sensor data, the camera detection head can be trained using only camera sensor data, the fused sensor detection head can be trained using data from multiple sensors, etc.).

In some aspects, each of the detection heads can make a prediction at inference time. In some examples, an AV may select one of the predictions based on the corresponding sensing modality. That is, if only LiDAR data is available, the AV may discard predictions made by the camera detection head, the RADAR detection head, and the fused sensor detection head. In some configurations, the predictions from each of the detection heads can be associated with a confidence metric and/or a probability metric. In some examples, an AV may select and/or rely upon one or more of the predictions based on the confidence metric and/or the probability metric.

FIG. 1 is a diagram illustrating an example autonomous vehicle (AV) management system 100, according to some examples of the present disclosure. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include one or more types of sensors and can be arranged about the AV 102. For instance, the sensor systems 104-108 can include Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other examples may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some examples, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102: communicating with the data center 150, the client computing device 170, and other systems: receiving inputs from riders, passengers, and other entities within the AV's environment: logging metrics collected by the sensor systems 104-108: and so forth. In this example, the local computing device 110 includes a perception stack 112, a mapping and localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can identify environmental uncertainties, such as where to look for moving objects, flag areas that may be obscured or blocked from view, and so forth. In some examples, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 114 can determine the AV's position and orientation (pose) using different methods from multiple systems (e.g., GPS, IMUs, cameras, LIDAR, RADAR, ultrasonic sensors, the HD geospatial database 126, etc.). For example, in some cases, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some examples, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating: turn on the left blinker, decelerate if the AV is above a threshold range for turning, and turn left: turn on the right blinker, accelerate if the AV is stopped or below the threshold range for turning, and turn right: decelerate until completely stopped and reverse: etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes: legal or illegal u-turn lanes: permissive or protected only right turn lanes: etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some examples, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can include a private cloud (e.g., an enterprise network, a co-location provider network, etc.), a public cloud (e.g., an Infrastructure as a Service (IaaS) network, a Platform as a Service (PaaS) network, a Software as a Service (Saas) network, or other Cloud Service Provider (CSP) network), a hybrid cloud, a multi-cloud, and/or any other network. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridesharing platform 160, and a map management platform 162, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, the map management platform 162, and other platforms and systems. Using the AI/ML platform 154, data scientists can prepare data sets from the data management platform 152: select, design, and train machine learning models: evaluate, refine, and deploy the models; maintain, monitor, and retrain the models: and so on.

The simulation platform 156 can enable testing and validation of the algorithms, machine learning models, neural networks, and other development efforts for the AV 102, the remote assistance platform 158, the ridesharing platform 160, the map management platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from a cartography platform (e.g., map management platform 162): modeling the behavior of other vehicles, bicycles, pedestrians, and other dynamic elements: simulating inclement weather conditions, different traffic scenarios: and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ridesharing application 172. The client computing device 170 can be a customer's mobile computing device or a computing device integrated with the AV 102 (e.g., the local computing device 110). The ridesharing platform 160 can receive requests to pick up or drop off from the ridesharing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as to track specific changes that (human or machine) map editors have made to the data and to revert changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some aspects, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ridesharing platform 160 may incorporate the map viewing services into the client application 172 to enable passengers to view the AV 102 in transit en route to a pick-up or drop-off location, and so on.

While the AV 102, the local computing device 110, and the AV management system 100 are shown to include certain systems and components, one of ordinary skill will appreciate that the AV 102, the local computing device 110, and/or the AV management system 100 can include more or fewer systems and/or components than those shown in FIG. 1. For example, the AV 102 can include other services than those shown in FIG. 1 and the local computing device 110 can also include, in some instances, one or more memory devices (e.g., RAM, ROM, cache, and/or the like), one or more network interfaces (e.g., wired and/or wireless communications interfaces and the like), and/or other hardware or processing devices that are not shown in FIG. 1. An illustrative example of a computing device and hardware components that can be implemented with the local computing device 110 is described below with respect to FIG. 6.

Figure 2:
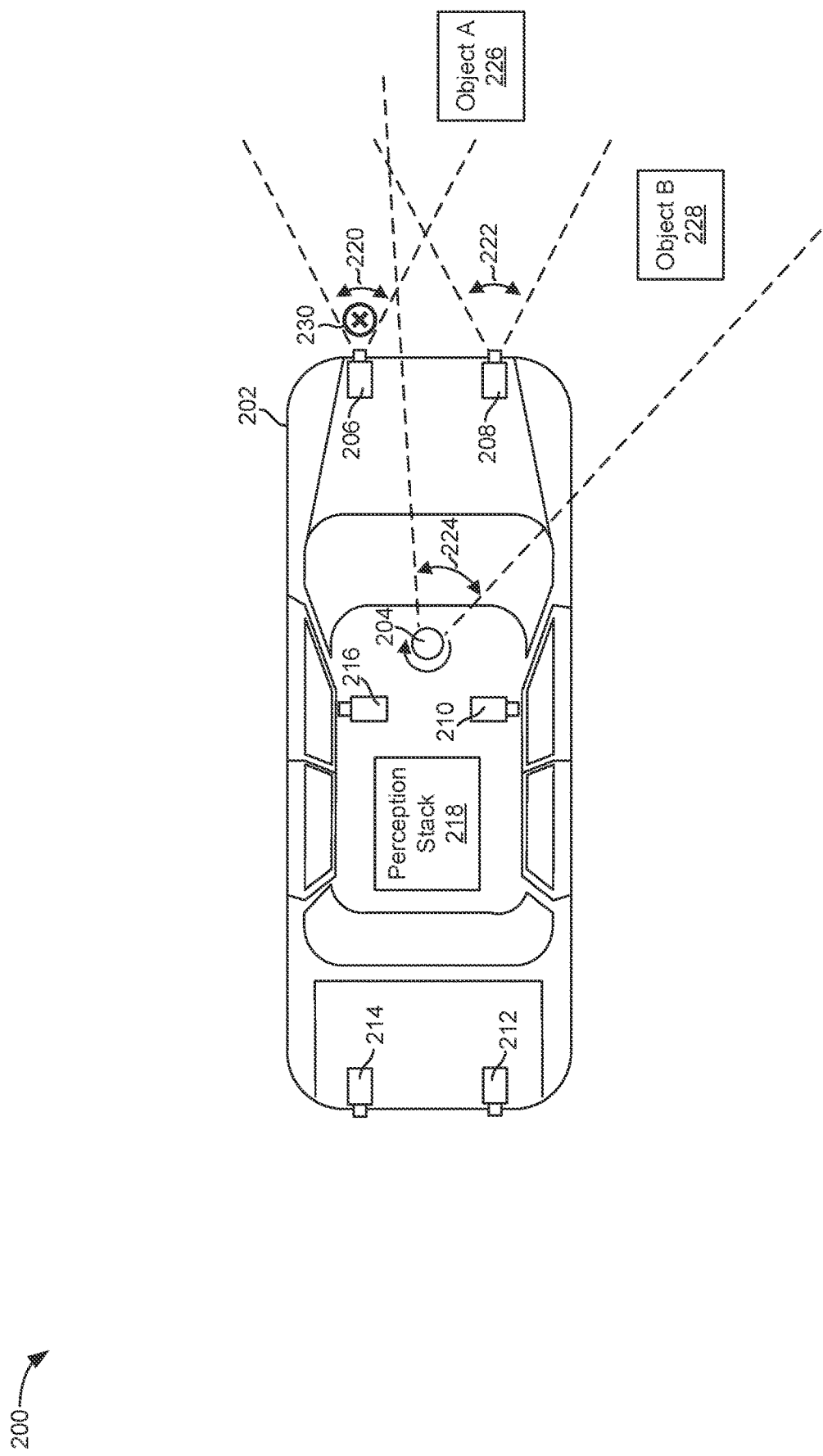
FIG. 2 is a system diagram illustrating an example of an autonomous vehicle having multiple sensors, in accordance with some examples of the present disclosure.

FIG. 2 is a diagram illustrating an example of a system 200 that includes an autonomous vehicle 202. In some aspects, autonomous vehicle 202 can correspond to autonomous vehicle 102. In some cases, autonomous vehicle 202 can include one or more sensors such as LiDAR 204, camera 206, camera 208, camera 210, camera 212, camera 214, and/or camera 216. In some examples, the sensors on autonomous vehicle 202 can correspond to sensor systems 104-108.

In some instances, one or more of the sensors on autonomous vehicle 202 can be associated with a corresponding field of view. For example, LiDAR 204 may have a field of view 224. In some aspects, field of view 224 of LiDAR 204 may be fixed or dynamic. For example, LiDAR 204 may correspond to a rotating LiDAR that can capture a 360-degree field of view. Although autonomous vehicle 202 is illustrated as having a single LiDAR, the present technology contemplates that additional LiDAR sensors may be coupled to autonomous vehicle 202. In some aspects, camera 206 may have a field of view 220 and camera 208 may have a field of view 222. In some cases, the field of view for one sensor may overlap with the field of view of another sensor. For instance, as illustrated, field of view 220 of camera 206 overlaps with field of view 222 of camera 208. Similarly, as illustrated, field of view 224 of LiDAR 204 partially overlaps with field of view 220 of camera 206 and also with field of view 222 of camera 208.

In some examples, autonomous vehicle 204 can include a perception stack 218 that can be used to process sensor data. For example, as discussed above in connection with perception stack 112, perception stack 218 can use sensor data to detect and classify objects and determine their current locations, speeds, directions, etc. For example, perception stack 218 can use sensor data from LiDAR 204 to detect and identify object A 226 and/or object B 228 that are both within the field of view 224 of LiDAR 204. Similarly, perception stack 218 can use sensor data from camera 208 to detect and identify object A 226 that is within the field of view 222 of camera 208.

In some aspects, perception stack 218 can include a machine learning model that is trained to perform object detection based on sensor data. In some cases, the machine learning model within perception stack 218 may fuse (e.g., combine, merge, join, etc.) data from two or more sensors to improve the prediction. For example, the machine learning model within perception stack 218 may fuse data from camera 208 with data from LiDAR 204 in order to detect and identify object A 226. In another example, the machine learning model within perception stack 218 may also fuse data from camera 206 with data from camera 208 and/or with data from LiDAR 204 to help detect and identify object A 226 (e.g., object A 226 is partially within the field of view 220 of camera 206).

In some aspects, the machine learning model within perception stack 218 may perform sensor data fusion by weighing the sensor data based on sensor quality and/or sensor fidelity. In some configurations, the machine learning model within perception stack 218 may perform sensor data fusion by correlating the corresponding field of view for each sensor. For instance, data from LiDAR 204 can be fused with data from camera 208 in the area in which field of view 224 overlaps with field of view 222.

In some examples, one or more sensors on autonomous vehicle 202 may not be available to the perception stack 218. For example, the performance of a sensor may degrade over time and/or the sensor may be unable to accurately capture sensor data due to a malfunction, dirt, water, and/or any other factor or fault condition. For example, as illustrated, camera 206 is unable to capture camera senor data due to fault 230. In some aspects, the machine learning model within perception stack 218 can include multiple detection heads that are trained to perform object detection based on different sensor modalities. For instance, the machine learning model within perception stack 218 may include a first detection head that can detect and identify object A 226 based on data from LiDAR 204: a second detection head that can detect and identify object A 226 based on data from camera 208: and a third detection head that can identify object A 226 based on fused sensor data corresponding to LiDAR 204 and camera 208. In another example, the machine learning model within perception stack 218 may use the first detection head (e.g., LiDAR based detection head) to detect and identify object B 228 based on data from LiDAR 204 (e.g., without any corresponding camera data).

Figure 3:
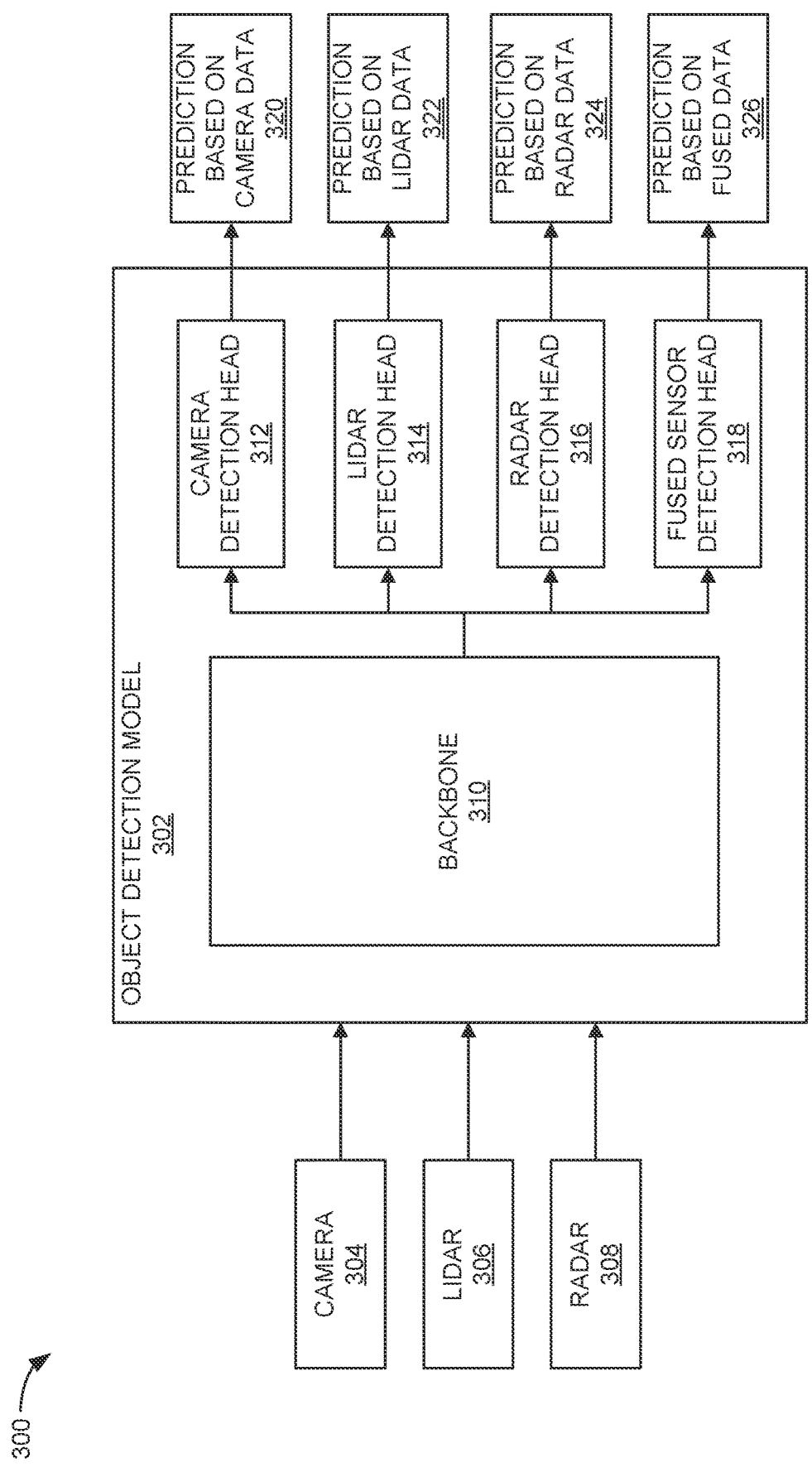
FIG. 3 is a system diagram illustrating an example of a machine learning model having multiple detection heads for processing sensor data, in accordance with some examples of the present disclosure.

FIG. 3 is a diagram illustrating an example of a system 300 that includes a machine learning model having multiple detection heads for processing sensor data. In some aspects, system 300 may be a component of prediction stack 116 and/or prediction stack 218. In some configurations, system 300 can include object detection model 302. In some examples, object detection model 302 can be trained to detect and identify objects based on data from one or more sensors. For example, object detection model 302 can be trained to output predictions for object classification as well as bounding boxes that correspond to the detected objects.

In some aspects, object detection model 302 can receive inputs from one or more sensors (e.g., sensor systems 104-108). For instance, object detection model 302 can receive camera sensor data from camera 304: LiDAR sensor data from LiDAR 306; and/or RADAR sensor data from RADAR 308. In some examples, object detection model 302 can include a backbone 310 that can process sensor data from camera 304, LiDAR 306, and/or RADAR 308. For example, backbone 310) can process sensor data to extract properties and features and to determine information related to position and object structure. In some cases, backbone 310 can perform fusion of sensor data corresponding to different sensor modalities. For example, backbone 310 can fuse (e.g., combine) all or a portion of sensor data received from camera 304, LiDAR 306, and/or RADAR 308.

In some configurations, object detection model 302 can include multiple detection heads that are configured (e.g., trained) to make predictions based on different types of sensor data. For example, object detection model 302 can include camera detection head 312 that can be trained to make prediction 320 based on camera data. In another example, object detection model 302 can include LiDAR detection head 314 that can be trained to make prediction 322 based on LiDAR data. In another example, object detection model 302 can include RADAR detection head 316 that can be trained to make prediction 324 based on RADAR data. In another example, object detection model 302 can include fused sensor detection head 318 that can be trained to make prediction 326 based on fused sensor data (e.g., combination of camera sensor data, LiDAR sensor data, RADAR sensor data, any other sensor data, and/or any combination thereof).

In some examples, camera detection head 312, LiDAR detection head 314, RADAR detection head 316, and/or fused sensor detection head 318 can be parallel and identical detection heads associated with backbone 310. In some aspects, camera detection head 312, LiDAR detection head 314, RADAR detection head 316, and/or fused sensor detection head 318 can be trained adaptively based on the input training data. For example, camera detection head 312 can be trained when only camera 304 is present; LiDAR detection head 314 can be trained when only LiDAR 306 is present: RADAR detection head 316 can be trained when only RADAR 308 is present: and fused sensor detection head 318 can be trained when each of the sensors corresponding to the fusion are present (e.g., camera 304 and LiDAR 306; camera 304 and RADAR 308; LiDAR 306 and RADAR 308: or camera 304, LiDAR 306, and RADAR 308).

In some instances, object detection model 302 can be trained such that there is no regression in prediction quality when one or more sensing modalities are missing. For example, at inference time, all of the detection heads can produce a prediction (e.g., camera detection head 312 will produce prediction 320: LiDAR detection head 314 will produce prediction 322: RADAR detection head 316 will produce prediction 324, and fused sensor detection head 318 will produce prediction 326). In some examples, the prediction stack (e.g., prediction stack 218) can select a prediction based on the sensing modality. For example, referring to FIG. 2, prediction stack 218 can select prediction 322 (e.g., based only on LiDAR data from LiDAR 204) with respect to object B 228.

In some examples, each prediction (e.g., prediction 320, prediction 322, prediction 324, and prediction 326) can be associated with a confidence score. In some instances, the confidence score can provide an indication of the likelihood of an error in the prediction (e.g., in the object classification and/or the bounding box). For example, a confidence score that is greater than 90% can indicate that there is a 10% chance that the object classification is incorrect or that there is an error in the bounding box.

In some aspects, the prediction stack (e.g., prediction stack 218) can select a prediction based on a corresponding confidence score. For example, if the confidence score associated with prediction 326 based on fused sensor data indicates that there is a 30% probability that a pedestrian was detected, the prediction stack can look at prediction 320 based on camera data and/or prediction 322 based on LiDAR data to determine if there is a higher confidence score associated with either of those predictions.

Figure 4:
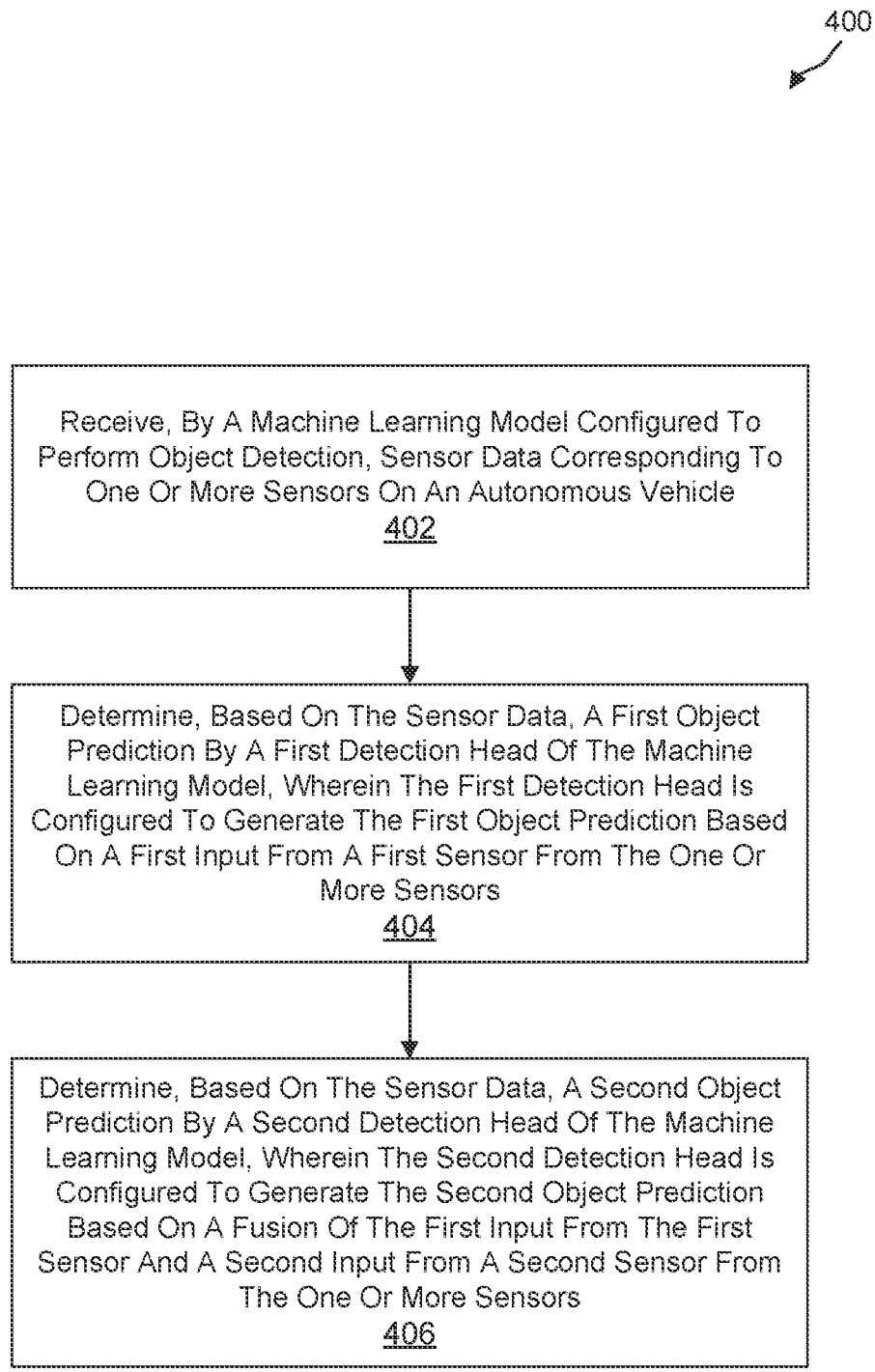
FIG. 4 is a flowchart diagram illustrating an example method for processing sensor data using a machine learning model having multiple detection heads, in accordance with some examples of the present disclosure.

FIG. 4 illustrates an example of a process 400 for processing sensor data using a machine learning model having multiple detection heads. At step 402, the process 400 includes receiving, by a machine learning model configured to perform object detection, sensor data corresponding to one or more sensors on an autonomous vehicle. For example, object detection model 302 can receive sensor data corresponding to camera 304, LiDAR 306, and/or RADAR 308.

At step 404, the process 400 includes determining, based on the sensor data, a first object prediction by a first detection head of the machine learning model, wherein the first detection head is configured to generate the first object prediction based on a first input from a first sensor from the one or more sensors. For instance, camera detection head 312 can determine prediction 320 based on camera sensor data from camera 304.

At step 406, the process 400 includes determining, based on the sensor data, a second object prediction by a second detection head of the machine learning model, wherein the second detection head is configured to generate the second object prediction based on a fusion of the first input from the first sensor and a second input from a second sensor from the one or more sensors. In some aspects, the first sensor can correspond to a camera sensor and the second sensor can correspond to a Light Detection and Ranging (LiDAR) sensor. For example, fused sensor detection head 318 can determine prediction 326 based on fused sensor data corresponding to sensor data from camera 304 and sensor data from LiDAR 306. In some examples, the first detection head and the second detection head are associated with a sensor fusion backbone of the machine learning model. For instance, camera detection head 312 and LiDAR detection head 314 are associated with backbone 310 of object detection model 302.

In some examples, the process 400 can include determining, based on the sensor data, a third object prediction by a third detection head of the machine learning model, wherein the third detection head is configured to generate the third object prediction based on the second input from the second sensor. For instance, LiDAR detection head 314 can determine prediction 322 based on sensor data from LiDAR 306.

In some aspects, the process 400 can include calculating a first probability metric that is associated with the first object prediction and a second probability metric that is associated with the second object prediction and selecting one of the first object prediction and the second object prediction based on the first probability metric and the second probability metric. For example, object detection model 302 can calculate a first probability metric that is associated with prediction 320 based on camera data and a second probability metric that is associated with prediction 326 based on fused sensor data. In some aspects, perception stack 218 can select either prediction 320 or prediction 326 based on the first and second probability metrics.

In some instances, the process 400 can include determining a first field of view associated with the first sensor and a second field of view associated with the second sensor, wherein the fusion corresponds to an overlapping field of view between the first field of view and the second field of view, and identifying an object in the overlapping field of view based on the second object prediction. For example, an object detection model operating within perception stack 218 (e.g., object detection model 302) can determine that field of view 224 is associated with LiDAR 204 and field of view 222 is associated with camera 208. In some aspects, the object detection model can perform sensor data fusion (e.g., combine sensor data) based on an overlap between field of view 224 and field of view 222. In some cases, perception stack 218 can identify object A 226 based on the object prediction that is based on fused sensor data (e.g., prediction 326).

In some aspects, the process 400 can include discarding the second object prediction in response to determining that the second input from the second sensor is defective or is missing. For example, perception stack 218 can discard prediction 320 from camera detection head 312 in response to determining that camera 206 is associated with fault 230 (e.g., data from camera 206 is defective or missing).

Figure 5:
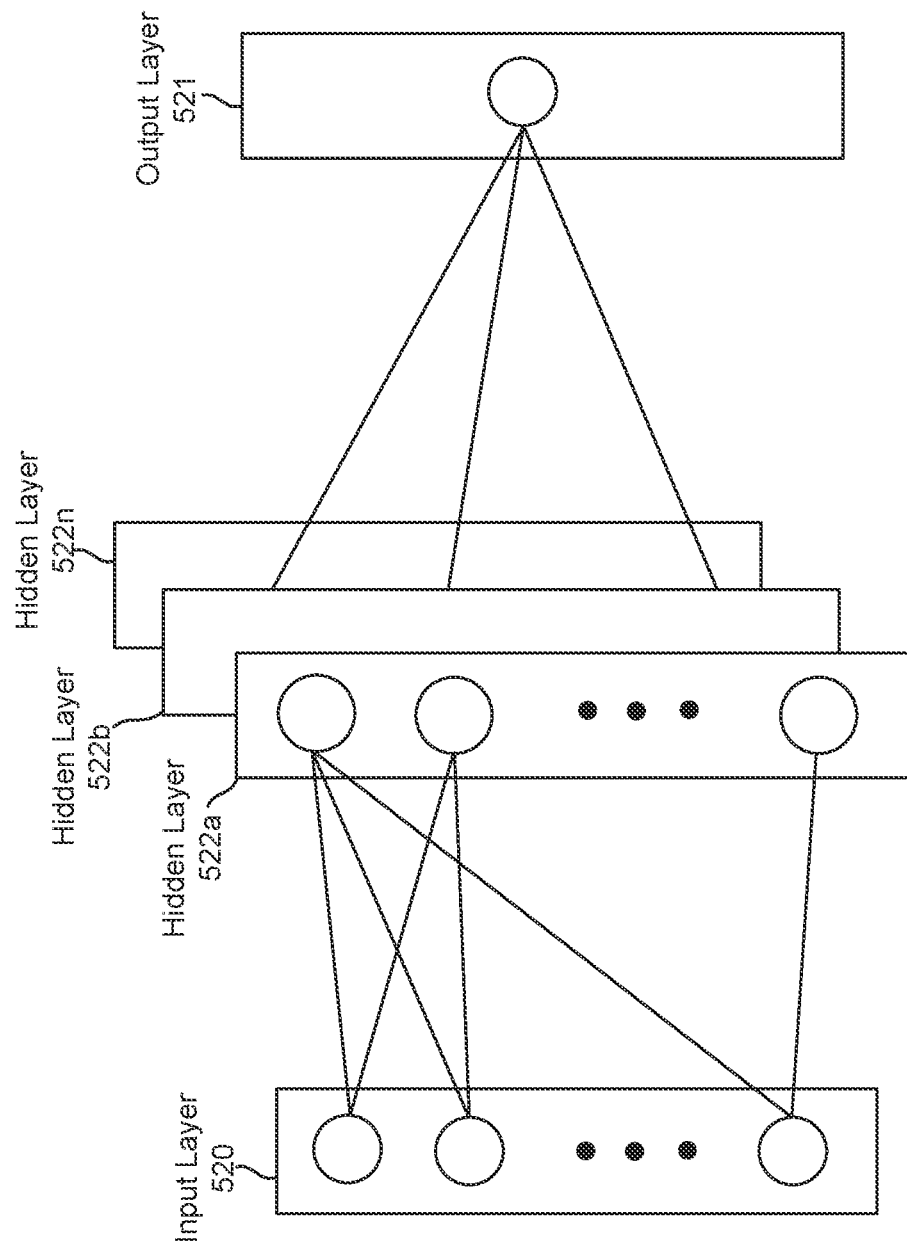
FIG. 5 illustrates an example of a deep learning neural network that can be used to implement aspects of the present technology, in accordance with some examples of the present disclosure.

In FIG. 5, the disclosure now turns to a further discussion of models that can be used to implement the systems and techniques described herein. FIG. 5 is an example of a deep learning neural network 500 that can be used to implement all or a portion of the systems and techniques described herein (e.g., neural network 500 can be used to implement a perception module (or perception system) as discussed above). An input layer 520 can be configured to receive sensor data (e.g., camera data, LiDAR data, radar data, etc.) and/or data relating to an environment surrounding an AV. The neural network 500 includes multiple hidden layers

522*a*, 522*b*, through 522*n*. The hidden layers 522*a*, 522*b*, through 522*n* include "n" number of hidden layers, where "n" is an integer greater than or equal to one. The number of hidden layers can be made to include as many layers as needed for the given application. In some aspects, the hidden layers 522*a*, 522*b*, through 522*n* can include a backbone that can be configured to process sensor data. For example, hidden layers 522*a*, 522*b*, through 522*n* can be configured to fuse data from different sensors that corresponds to the same field of view (e.g., camera data and LiDAR data corresponding to a same geographic area can be fused).

In some aspects, the neural network 500 further includes an output layer 521 that provides an output resulting from the processing performed by the hidden layers 522*a*, 522*b*, through 522*n*. In one illustrative example, the output layer 521 can include multiple detection heads that can make a prediction (e.g., perform object classification, identify bounding boxes, calculate a confidence score, etc.) that is based on the sensor data. In some cases, each detection head in output layer 521 can be configured to make a prediction based on a particular sensor modality. For instance, a first detection head can make a prediction based on camera sensor data, a second detection head can make a prediction based on LiDAR sensor data, and a third detection head can make a prediction based on fused sensor data.

The neural network 500 is a multi-layer neural network of interconnected nodes. Each node can represent a piece of information. Information associated with the nodes is shared among the different layers and each layer retains information as information is processed. In some cases, the neural network 500 can include a feed-forward network, in which case there are no feedback connections where outputs of the network are fed back into itself. In some cases, the neural network 500 can include a recurrent neural network, which can have loops that allow information to be carried across nodes while reading in input.

Information can be exchanged between nodes through node-to-node interconnections between the various layers. Nodes of the input layer 520 can activate a set of nodes in the first hidden layer 522*a*. For example, as shown, each of the input nodes of the input layer 520 is connected to each of the nodes of the first hidden layer 522*a*. The nodes of the first hidden layer 522*a* can transform the information of each input node by applying activation functions to the input node information. The information derived from the transformation can then be passed to and can activate the nodes of the next hidden layer 522*b*, which can perform their own designated functions. Example functions include convolutional, up-sampling, data transformation, and/or any other suitable functions. The output of the hidden layer 522*b* can then activate nodes of the next hidden layer, and so on. The output of the last hidden layer 522*n* can activate one or more nodes of the output layer 521, at which an output (e.g., prediction) is provided. In some cases, while nodes in the neural network 500 are shown as having multiple output lines, a node can have a single output and all lines shown as being output from a node represent the same output value.

In some cases, each node or interconnection between nodes can have a weight that is a set of parameters derived from the training of the neural network 500. Once the neural network 500 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 500 to be adaptive to inputs and able to learn as more and more data is processed.

The neural network 500 is pre-trained to process the features from the data in the input layer 520 using the different hidden layers 522*a*, 522*b*, through 522*n* in order to provide the output through the output layer 521.

In some cases, the neural network 500 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network 500 is trained well enough so that the weights of the layers are accurately tuned.

In some aspects, the neural network 500 can be trained using different sets of training data. For example, a first set of training data may include sensor data corresponding to a camera sensor that can be used to train the detection head that makes predictions based on camera sensor data. In another example, a second set of training data may include sensor data corresponding to a LiDAR sensor that can be used to train the detection head the makes predictions based on LiDAR sensor data. In another example, a third set of training data may include camera sensor data and LiDAR sensor data that can be used to train the detection head that makes predictions based on camera-LiDAR sensor fusion (e.g., camera and LiDAR data can be fused by a camera-LiDAR fusion backbone.

To perform training, a loss function can be used to analyze error in the output. Any suitable loss function definition can be used, such as a Cross-Entropy loss. Another example of a loss function includes the mean squared error (MSE), defined as $E\_total = \Sigma(\frac{1}{2} (target-output)^2)$. The loss can be set to be equal to the value of E_total.

The loss (or error) will be high for the initial training data since the actual values will be much different than the predicted output. The goal of training is to minimize the amount of loss so that the predicted output is the same as the training output. The neural network 500 can perform a backward pass by determining which inputs (weights) most contributed to the loss of the network, and can adjust the weights so that the loss decreases and is eventually minimized.

The neural network 500 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for downsampling), and fully connected layers. The neural network 500 can include any other deep network other than a CNN, such as an autoencoder, Deep Belief Nets (DBNs), Recurrent Neural Networks (RNNs), among others.

As understood by those of skill in the art, machine-learning based classification techniques can vary depending on the desired implementation. For example, machine-learning classification schemes can utilize one or more of the following, alone or in combination: hidden Markov models: RNNs: CNNs: deep learning: Bayesian symbolic methods: Generative Adversarial Networks (GANs): support vector machines: image registration methods: and applicable rule-based systems. Where regression algorithms are used, they may include but are not limited to: a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Minwise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Figure 6:
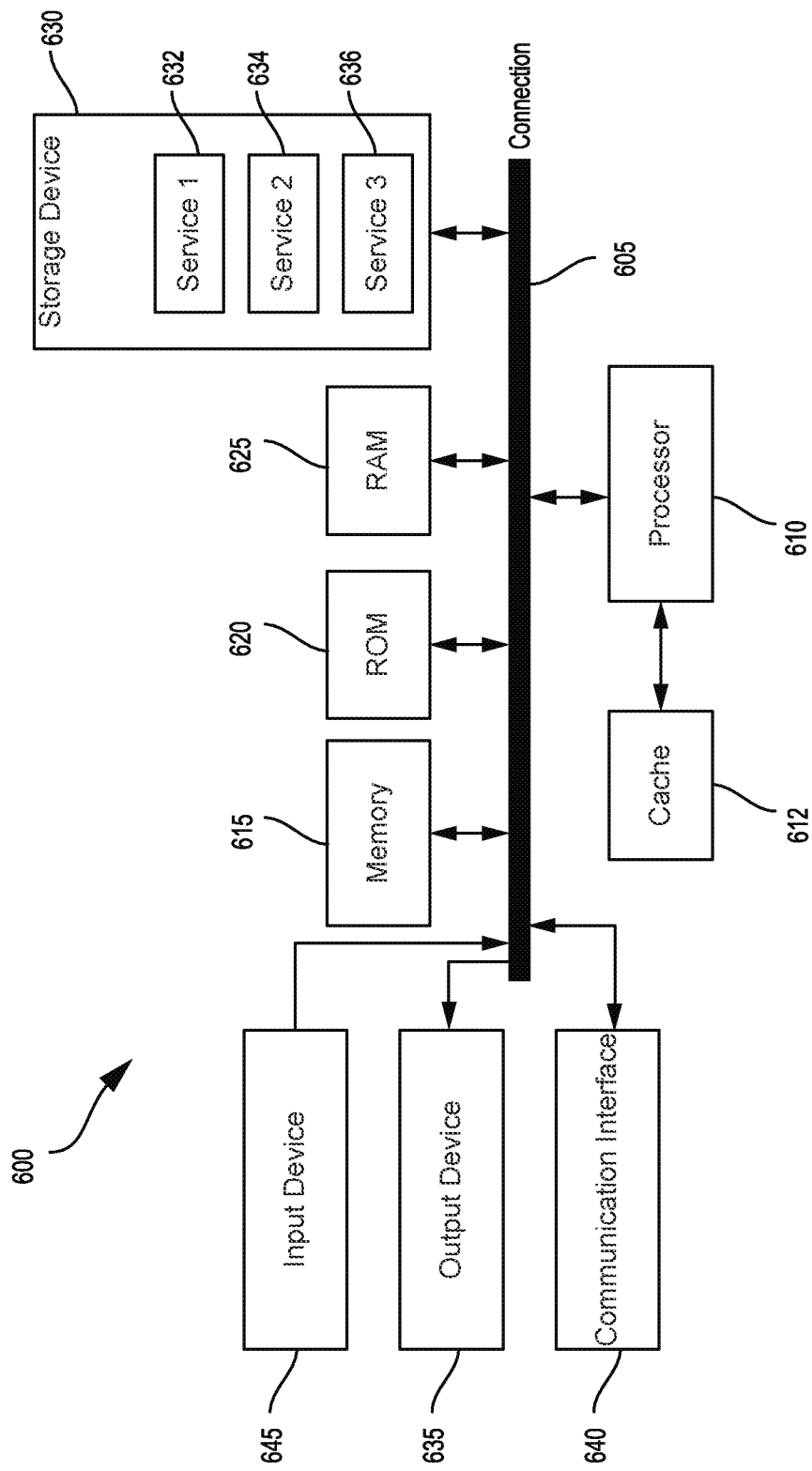
FIG. 6 is a diagram illustrating an example system architecture for implementing certain aspects described herein, in accordance with some examples of the present disclosure.

FIG. 6 illustrates an example processor-based system with which some aspects of the subject technology can be implemented. For example, processor-based system 600 can be any computing device making up local computing device 110, a passenger device executing the ridesharing application 172, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some examples, computing system 600 is a distributed system in which the functions described in this disclosure can be distributed within a datacenter, multiple data centers, a peer network, etc. In some cases, one or more of the described system components represents many such components each performing some or all of the function for which the component is described. In some aspects, the components can be physical or virtual devices.

Example system 600 includes at least one processing unit (CPU or processor) 610 and connection 605 that couples various system components including system memory 615, such as read-only memory (ROM) 620 and random-access memory (RAM) 625 to processor 610. Computing system 600 can include a cache of high-speed memory 612 connected directly with, in close proximity to, and/or integrated as part of processor 610.

Processor 610 can include any general-purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 can include an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/9G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communications interface 640 may also include one or more Global Navigation Satellite System (GNSS) receivers or transceivers that are used to determine a location of the computing system 600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 630 can be a non-volatile and/or non-transitory computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L9/L #), resistive random-access memory (RRAM/ReRAM), phase change memory (PCM), spin transfer torque RAM (STT-RAM), another memory chip or cartridge, and/or a combination thereof.

Storage device 630 can include software services, servers, services, etc., that when the code that defines such software is executed by the processor 610, causes the system to perform a function. In some examples, a hardware service that performs a particular function can include the software component stored in a computer-readable medium in connection with the necessary hardware components, such as processor 610, connection 605, output device 635, etc., to carry out the function.

As understood by those of skill in the art, machine-learning techniques can vary depending on the desired implementation. For example, machine-learning schemes can utilize one or more of the following, alone or in combination: hidden Markov models; recurrent neural networks: convolutional neural networks (CNNs): deep learning; Bayesian symbolic methods: general adversarial networks (GANs): support vector machines: image registration methods: applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Mini-wise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Aspects within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special-purpose computer, or special-purpose processing device to perform a certain function or group of functions. By way of example, computer-executable instructions can be used to implement perception system functionality for determining when sensor cleaning operations are needed or should begin. Computer-executable instructions can also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other examples of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination thereof) through a communications network. In a distributed computing environment, program modules can be located in both local and remote memory storage devices.

The various examples described above are provided by way of illustration only and should not be construed to limit the scope of the disclosure. For example, the principles herein apply equally to optimization as well as general improvements. Various modifications and changes may be made to the principles described herein without following the examples and applications illustrated and described herein, and without departing from the scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A method comprising:
   receiving, by a machine learning model configured to perform object detection, sensor data corresponding to one or more sensors on an autonomous vehicle;
   determining, based on the sensor data, a first object prediction by a first detection head of the machine learning model, wherein the first detection head is configured to generate the first object prediction based on a first input from a first sensor from the one or more sensors; and
   determining, based on the sensor data, a second object prediction by a second detection head of the machine learning model, wherein the second detection head is configured to generate the second object prediction based on a fusion of the first input from the first sensor and a second input from a second sensor from the one or more sensors; and
   maneuvering the autonomous vehicle based at least in part on the first object prediction and the second object prediction.

2. The method of claim 1, further comprising:
   determining, based on the sensor data, a third object prediction by a third detection head of the machine learning model, wherein the third detection head is configured to generate the third object prediction based on the second input from the second sensor.

3. The method of claim 1, wherein the first sensor corresponds to a camera sensor and the second sensor corresponds to a Light Detection and Ranging (LiDAR) sensor.

4. The method of claim 1, wherein the first detection head and the second detection head are associated with a sensor fusion backbone of the machine learning model.

5. The method of claim 1, further comprising:
calculating a first probability metric that is associated with the first object prediction and a second probability metric that is associated with the second object prediction; and
selecting one of the first object prediction and the second object prediction based on the first probability metric and the second probability metric.

6. The method of claim 1, further comprising:
determining a first field of view associated with the first sensor and a second field of view associated with the second sensor, wherein the fusion corresponds to an overlapping field of view between the first field of view and the second field of view; and
identifying an object in the overlapping field of view based on the second object prediction.

7. The method of claim 1, further comprising:
discarding the second object prediction in response to determining that the second input from the second sensor is defective.

8. An apparatus comprising:
at least one memory comprising instructions; and
at least one processor configured to execute the instructions and cause the at least one processor to:
receive, by a machine learning model configured to perform object detection, sensor data corresponding to one or more sensors on an autonomous vehicle;
determine, based on the sensor data, a first object prediction by a first detection head of the machine learning model, wherein the first detection head is configured to generate the first object prediction based on a first input from a first sensor from the one or more sensors;
determine, based on the sensor data, a second object prediction by a second detection head of the machine learning model, wherein the second detection head is configured to generate the second object prediction based on a fusion of the first input from the first sensor and a second input from a second sensor from the one or more sensors; and
maneuver the autonomous vehicle based at least in part of the first object prediction and the second object prediction.

9. The apparatus of claim 8, wherein the at least one processor is further configured to:
determine, based on the sensor data, a third object prediction by a third detection head of the machine learning model, wherein the third detection head is configured to generate the third object prediction based on the second input from the second sensor.

10. The apparatus of claim 8, wherein the first sensor corresponds to a camera sensor and the second sensor corresponds to a Light Detection and Ranging (LiDAR) sensor.

11. The apparatus of claim 8, wherein the first detection head and the second detection head are associated with a sensor fusion backbone of the machine learning model.

12. The apparatus of claim 8, wherein the at least one processor is further configured to:
calculate a first probability metric that is associated with the first object prediction and a second probability metric that is associated with the second object prediction; and
select one of the first object prediction and the second object prediction based on the first probability metric and the second probability metric.

13. The apparatus of claim 8, wherein the at least one processor is further configured to:
determine a first field of view associated with the first sensor and a second field of view associated with the second sensor, wherein the fusion corresponds to an overlapping field of view between the first field of view and the second field of view; and
identify an object in the overlapping field of view based on the second object prediction.

14. The apparatus of claim 8, wherein the at least one processor is further configured to:
discard the second object prediction in response to determining that the second input from the second sensor is defective.

15. A non-transitory computer-readable storage medium having stored thereon instructions which, when executed by one or more processors, cause the one or more processors to:
receive, by a machine learning model configured to perform object detection, sensor data corresponding to one or more sensors on an autonomous vehicle;
determine, based on the sensor data, a first object prediction by a first detection head of the machine learning model, wherein the first detection head is configured to generate the first object prediction based on a first input from a first sensor from the one or more sensors; and
determine, based on the sensor data, a second object prediction by a second detection head of the machine learning model, wherein the second detection head is configured to generate the second object prediction based on a fusion of the first input from the first sensor and a second input from a second sensor from the one or more sensors; and
maneuver the autonomous vehicle based at least in part on the first object prediction and the second object prediction.

16. The non-transitory computer-readable storage medium of claim 15, comprising further instructions which, when executed by the one or more processors, cause the one or more processors to:
determine, based on the sensor data, a third object prediction by a third detection head of the machine learning model, wherein the third detection head is configured to generate the third object prediction based on the second input from the second sensor.

17. The non-transitory computer-readable storage medium of claim 15, wherein the first sensor corresponds to a camera sensor and the second sensor corresponds to a Light Detection and Ranging (LiDAR) sensor.

18. The non-transitory computer-readable storage medium of claim 15, wherein the first detection head and the second detection head are associated with a sensor fusion backbone of the machine learning model.

19. The non-transitory computer-readable storage medium of claim 15, comprising further instructions which, when executed by the one or more processors, cause the one or more processors to:
calculate a first probability metric that is associated with the first object prediction and a second probability metric that is associated with the second object prediction; and select one of the first object prediction and the second object prediction based on the first probability metric and the second probability metric.

20. The non-transitory computer-readable storage medium of claim 15, comprising further instructions which, when executed by the one or more processors, cause the one or more processors to:
  determine a first field of view associated with the first sensor and a second field of view associated with the second sensor, wherein the fusion corresponds to an overlapping field of view between the first field of view and the second field of view; and
  identify an object in the overlapping field of view based on the second object prediction.

* * * * *